Patented Sept. 1, 1925.

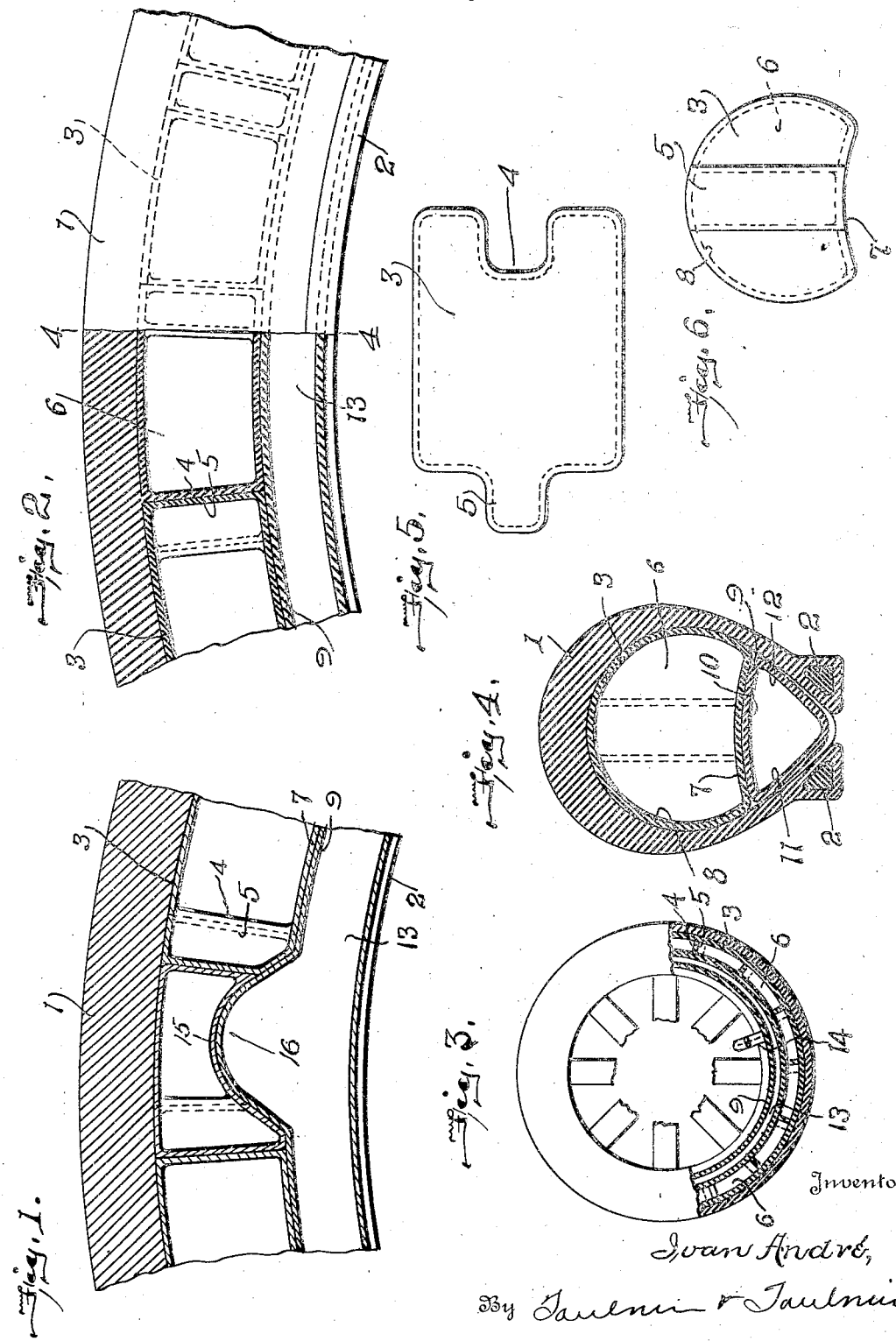

1,552,106

UNITED STATES PATENT OFFICE.

IVAN ANDRÉ, OF DELAND, FLORIDA.

PNEUMATIC TIRE.

Application filed September 15, 1922. Serial No. 588,396.

*To all whom it may concern:*

Be it known that I, IVAN ANDRÉ, a subject of the King of Great Britain, residing at Deland, in the county of Volusia and State of Florida, have invented certain new and useful Improvements in Pneumatic Tires, of which the following is a specification, reference being had therein to the accompanying drawing.

My invention relates to tires and in particular to pneumatic tires.

It is the object of my invention to provide a tire that is substantially puncture proof, cannot blow out as an entirety, and can be repaired when injured in one of its units at a very economical cost.

It is a further object of my invention to provide means of continuing to operate the tire after a portion of it has been punctured or blown out without injury to the remainder of the tire or to the vehicle which carries it.

It is an additional object of my invention to provide the advantages of an inner tube when desired without the disadvantage of it becoming punctured or otherwise damaged by the entrance of nails and the like to the casing.

It is the object of my invention to prevent the sudden collapse of the tire and the liability of the tire becoming torn off when rounding a turn. It also eliminates the necessity for stopping in transit to repair a puncture.

It is a further object to provide an arrangement of parts which will enable the operator to locate the punctured portion immediately without a long and tedious search. It is further possible by my invention to carry extra sections which will require little space and can be inserted by one with little skill in handling automobile tires.

My invention eliminates spare wheels or spare tires, repair kits, and extends the life of the casing due to the fact that it will prevent it from ever running in a collapsed position.

Referring to the drawings:

Fig. 1 is a side elevation of a portion of the tire showing in dotted lines the location of the sections.

Fig. 2 is a side elevation of a portion of the tire partially in section showing the arrangement of sections with the base 2.

Fig. 3 is a side elevation of a complete wheel with the parts installed, the tire being partially in section.

Fig. 4 is a section on the line 4—4 of Fig. 2.

Fig. 5 is a plan view of one of the sections.

Fig. 6 is an end view of one of the sections.

Referring to the drawings in detail:

1 is the casing of a tire having the side beads 2. The outer portion of the tire is filled with a series of interlocking, inflated, elastic, units designated 3. These units are provided with a recessed portion 4 on one end and a projecting portion 5 on the other end.

The projecting portion on one unit projects into the recess portion in the other unit. Each one of these units has an air chamber 6 therein. The other walls of the unit are composed of a bottom 7 and a top 8, the top 8 being a little more than semi-circular, occupying about ⅔ of a complete circle, while 7, the bottom, is slightly arched. These sections can be inserted in the tire one by one interlocking with one another and if punctured or otherwise injured can be removed independently.

Beneath these sections is an inner tube designated 9. It is substantially triangular in section having a slightly curved upper wall 10 and side walls 11 and 12. An air passageway 13 is provided between the walls with which communicates the usual valve 14 for inflating and deflating the inner tube.

It is also to be noted that one of the sections or units 3 is provided with a concave inner wall 15 and the tube 9 will bulge, as at 16, to provide a pneumatic projection on its outer wall fitting in this concave portion and forming a pneumatic interlock so that the outer and inner parts of the inflated device cannot creep with respect to each other. Furthermore, it will be noted that the portions 3 are permanently closed cells and are thus imperforate. Under these conditions the recess 4 and projections 5 are radial with respect to these arcuate cells, so that any cell may be removed by radial displacement without collapsing either that cell or any other of the series.

Having described my invention as herein set forth I do not desire to confine myself to the details, but comprehend within it suitable modifications which may be found advisable in adapting my invention to varying conditions, which modifications fall within the terms and scope of the appended claims.

Having thus fully described my invention what I claim as new and desire to secure by Letters Patent, is:

1. In combination, a casing, a plurality of independent resilient pneumatic sections within the casing for supporting the casing, a pneumatic tube within said casing to support said sections in position within said casing and occupying a portion of the casing adjacent the rim zone thereof, one of said sections having a recessed portion, and a pneumatic projection on said tube extending in said recess whereby a pneumatic interlock is formed between the inflated members adapted to prevent creeping of said inflated members relatively to each other.

2. In combination, a casing, a plurality of removable independent resilient pneumatic sections within said casing, a removable pneumatic tube within said casing to support said sections in position within said casing and occupying a portion of the casing adjacent the rim zone thereof, one of said sections having a concave portion, and a bulge on said tube formed integral therewith adapted to fit into said concave portion when both the tube and sections are inflated forming a pneumatic interlock and adapted to prevent creeping of the inflated members relatively to each other.

3. In combination, a casing, a plurality of removable independent resilient pneumatic sections interlocking with each other arranged within said casing and removable in respect to said casing, a removable pneumatic tube within said casing to support said sections in position within said casing, and occupying a portion of the casing adjacent the rim zone thereof and removable in respect to said casing, one of said sections having a recess, and a projection on said tube fitting into the recess portion of the section forming a resilient pneumatic interlock between the inflated members and adapted to prevent creeping relatively to each other.

In testimony whereof, I affix my signature.

IVAN ANDRÉ.